United States Patent [19]

Namiki et al.

[11] 4,317,123
[45] Feb. 23, 1982

[54] THERMAL RECORDING MATERIAL

[75] Inventors: Tomizo Namiki; Osamu Seshimoto; Fumiaki Shinozaki; Akira Nahara; Tomoaki Ikeda, all of Asaka, Japan

[73] Assignee: Fuji Photo Film Co., Ltd., Minami-ashigara, Japan

[21] Appl. No.: 88,233

[22] Filed: Oct. 25, 1979

[30] Foreign Application Priority Data

Oct. 25, 1978 [JP] Japan .................. 53/131927

[51] Int. Cl.³ .................. G01D 15/34; G01D 15/10; B32B 15/08
[52] U.S. Cl. .................. 346/135.1; 346/76 R; 430/524; 430/536; 430/961; 428/333; 428/336; 428/447; 428/463; 428/913
[58] Field of Search .............. 428/447, 913, 355, 448, 428/450, 463, 522, 64, 65, 913, 451; 430/14, 18, 945, 131, 524, 536, 961; 427/131; 156/333; 346/135.1, 76 R, 77 R, 77 L, 77 E

[56] References Cited

U.S. PATENT DOCUMENTS

| | | | |
|---|---|---|---|
| 3,475,248 | 10/1969 | Brasure | 428/463 |
| 3,519,511 | 7/1970 | Coover, Jr. | 346/135.1 |
| 3,600,217 | 8/1971 | Eichorn et al. | 430/536 |
| 3,634,137 | 1/1972 | Akashi et al. | |
| 3,679,455 | 7/1972 | Kasugai et al. | 430/536 |
| 3,682,639 | 8/1972 | Barberkenn et al. | 430/536 |
| 3,984,583 | 10/1976 | Hermans et al. | 346/135.1 |
| 4,042,398 | 8/1977 | Holm et al. | 430/536 |
| 4,069,487 | 1/1978 | Kasai et al. | 346/135.1 |
| 4,075,384 | 2/1978 | Suzuki | 346/135.1 |
| 4,101,907 | 7/1978 | Bell et al. | 346/135.1 |
| 4,173,677 | 11/1979 | Nakano et al. | 428/463 |
| 4,196,254 | 4/1980 | Puskadi | 428/447 |
| 4,196,258 | 4/1980 | Huisman | 428/447 |

FOREIGN PATENT DOCUMENTS 54-101838 8/1979 Japan .................. 428/448

Primary Examiner—Stanley S. Silverman
Attorney, Agent, or Firm—Sughrue, Mion, Zinn, Macpeak & Seas

[57] ABSTRACT

A thermal recording material possessing high sensitivity which comprises a support having thereon in sequence a subbing layer, a recording layer and optionally, a protecting layer in which the subbing layer contains a composition comprising (A) 100 parts by weight of chlorinated polyolefin having a chlorine content of about 30% by weight or more and (B) 1 part to 100 parts by weight of aminoalkylalkoxysilane compound represented by the following general formula (I):

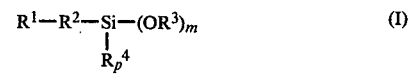

wherein $R^1$ represents an amino group or a $H_2N-R^5-NH-$ group; $R^2$ and $R^5$ each represents a polymethylene group having 1 to 2 carbon atoms or a straight or branched chain alkylene (alkanediyl) group having 3 to 5 carbon atoms, and may be the same or different; $R^3$ represents a straight or branched chain alkyl group having 1 to 5 carbon atoms; m represents 2 or 3; $R^4$ represents a straight or branched chain alkyl group having 1 to 5 carbon atoms or an $R^1-R^2-$ group; p represents 0 or 1, and $m+p=3$ using this composition the support and the recording layer are closely adhered to each other.

15 Claims, No Drawings

THERMAL RECORDING MATERIAL

BACKGROUND OF THE INVENTION

1. Field of the Invention

The present invention relates to a thermal recording material on which information is recorded through thermal deformation by irradiation with a beam of high energy density radiation. In greater detail the present invention relates to a thermal recording material in which a subbing layer containing both chlorinated polyolefin and an aminoalkylalkoxysilane compound between the support and the recording layer. The subbing layer can contribute to improvements in the sensitivity of the recording material and adhesion between the support and the recording layer.

2. Description of the Prior Art

Recording materials utilizing high energy beam of light such as a laser and the like, there have been known including thermal recording materials as described below in addition to silver salt-containing light sensitive materials. A thermal recording material generally comprises a recording layer of high optical density such that areas irradiated with a high energy density light beam produce local increases in temperature which result in thermal deformation such as fusion, evaporation, aggregation and so on and a difference in optical density results between the optically exposed areas and the optically unexposed areas. Thermal recording materials such as this possess several advantages. They do not require any developing and subsequent fixing. They make processings in a dark room unnecessary because of their insensitivity to ordinary indoor light. They can provide images of high contrast and they make it possible to put additional information on record (generally referred to as "add-on"), and so on.

Many of the processes for recording information on this type thermal recording material include, in general, the steps of transforming the information into electrical time series signals and scanning the recording material with a laser beam modulated in its amplitude according to such signals. These processes have an advantage that images can be recorded in real time.

The materials generally constituting the recording layers of thermal recording materials are metals, dyes, plastics and the like. It is generally possible to choose low-priced materials. The recording materials as described above are described in more detail in, for example, M. L. Levene, et al., *Electron, Ion and Laster Beam Technology*, transactions of 11th symposium (1969); *Electronics*, Mar. 18, 1968, page 50; D. Maydan, *The Bell System Technical Journal*, vol. 50 (1971), page 176; C. O. Carlson, *Science*, vol. 154 (1966), page 1550; and so on. Of these materials, those which utilize metals as recording layers, wherein thin layers of metals such as Bi, Sn, In and the like are, for example, laminated on supports, possess excellent characteristics as the thermal recording materials because images can be recorded thereon with high resolving power and high contrast.

However, recording materials utilizing thin metal layers suffer, in general, from the defect that generally 50% or more of the laser beam employed for recording is reflected from the thin metal layer and, therefore, the energy of the laser beam is not used effectively and a high power beam is required for recording. This is especially the case when rapid scanning where still higher power is required and, consequently, the apparatus becomes large and expensive.

Under these circumstances, some recording materials having high recording sensitivity have been investigated. As an example thereof, Japanese Patent Publication No. 40479/'71 propose a recording material of a triple-layer construction of Se, Bi and Ge in which a very thin layer of Ge is laminated on a thin layer containing Se and Bi to reduce reflectance. However, the use of Se is undesirable because it tends to cause pollution problems.

Another example of the recording material having a reflection preventing layer is described in Japanese Patent Application (OPI) No. 74632/'76, wherein a reflection preventing layer capable of absorbing light in the wave length region of the laser beam used for recording is provided on a metal layer. However, it is very difficult to get rid of light reflection completely by providing a reflection preventing layer on the metal layer. Even if it becomes possible to eliminate light reflection completely, the light source is often required to have high power in order to cause thermal deformation such as fusion, evaporation, aggregation or the like in the thin metal layer, as compared to that required for recording an image in a silver halide photosensitive material or an electrophotographic material.

In addition, recording layers of thermal recording materials and especially metal layers are liable to scratch. Therefore, a protecting layer is provided on the recording layer to improve durability, mechanical strength and keeping stability. The characteristics indispensable for the protecting layer are high transmittance with respect to a light beam of high energy density, high mechanical strength, low reactivity with a recording layer, good coating quality, facility in preparation and so on.

Substances employable for making the protecting layers may be either inorganic or organic compounds. Examples of inorganic compounds are transparent substances such as $Al_2O_3$, $SiO_2$, SiO, MgO, ZnO, $MgF_2$, $CuF_2$ and the like. On the other hand, the use organic substances is disclosed, for example, in each of Japanese Patent Applications (OPI) Nos. 96716/'74, 59626/'76, 75523/'76, 88024/'76 and 134633/'76. However, in recording materials having protecting layers as described above, the recording sensitivity decreases to a great extent, compared with those which do not have any protecting layers.

As described above, there is a need in this art to improve recording speed, reduce the size of the recording apparatus and the price thereof, to give practical sensitivity to a recording material even when a protecting layer having sufficient protecting ability is provided thereon, therefore, various investigations have been undertaken to obtain highly sensitive thermal recording materials.

As an example of investigation undertaken to improve the recording sensitivity, mention may be made of the Japanese Patent Application No. 77269/'78 (corresponding to U.S. patent application Ser. No. 52,277 filed June 26, 1979), in which a subbing layer containing chlorinated polyolefin is provided between a recording layer and a support for this purpose. Though the reason for the improvement in recording sensitivity brought about by the chlorinated polyolefin layer provided between the recording layer and the support is still not completely clear, it may be because the chlorinated polyolefin melts at a lower temperature than the recording layer does, the deformation of the recording layer can be accelerated by the melting of the chlorinated polyolefin. However, the adhesion between the recording layer and the support (namely the degree of difficulty arising in delamination of the recording layer from the support) is not changed, or is deteriorated to some extent by providing the chlorinated polyolefin layer, compared with the case that the chlorinated polyolefin layer is not provided therebetween. Therefore, depending upon handling or usage of the recording material, sometimes the adhesion is not sufficient. In addition, when a protecting layer is formed on the recording layer using a coating technique, a solvent contained in the coating solution can permeate into the recording layer to reach the chlorinated polyolefin layer. Under such a condition, the chlorinated polyolefin can be dissolved, and through such a dissolution cracks appear in the recording layer or the uniformity of the recording layer deteriorates. Accordingly, the solvent of the coating solution used for making the protecting layer can not be freely chosen which also restricts the choice of substances for the protecting layer since they must have high solubility in a given solvent and that solvent must be readily removed at the time of drying from the coated protecting layer.

SUMMARY OF THE INVENTION

Therefore, an object of the present invention is to provide a thermal recording material possessing high sensitivity and good adhesion between the recording layer and the support.

Another object of the present invention is to provide a highly sensitive thermal recording material having a subbing layer which makes it possible to select a wider range of solvents for making the protecting layer.

A further object of the present invention is to provide a highly sensitive thermal recording material having a chlorinated polyolefin-containing subbing layer which makes it possible to select not only the solvent but also the high molecular material employed for the protecting layer from a wide variety of solvents and high molecular materials, respectively.

From our research, it has been found that a thermal recording material obtained by forming on a support a subbing layer containing both a chlorinated polyolefin and an aminoalkylalkoxysilane compound and then, by forming thereon a recording layer possesses high sensitivity and excellent adhesion between the recording layer and the support. In addition, it has also been found that even if various solvents are employed as the solvent for making the protecting layer neither the subbing layer nor the recording layer suffer any damages due to the solvent used.

The statement that the subbing layer possesses "excellent solvent resistance" means that the subbing layer tends not to suffer any damage by coating solvent(s) used in providing layer(s) on or over the subbing layer. Particular mention must be made of the fact that only when an alkoxysilane compound containing an aminoalkyl group is added to the subbing layer is the improvement in adhesion between the recording layer and the support effected by the presence of the subbing layer.

The present invention thus provides a thermal recording material comprising a support having thereon in sequence a subbing layer and a recording layer, and is characterized by the composition contained in the subbing layer, which composition comprises (A) 100 parts by weight of chlorinated polyolefin having a chlorine content of about 30% by weight or more and (B) about 1 part to 100 parts by weight of an aminoalkyl alkoxysilane compound represented by the following general formula (I):

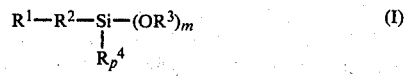

wherein $R^1$ represents an amino group or a $H_2N-R^5-NH-$ group; $R^2$ and $R^5$ each represents a polymethylene group having 1 to 2 carbon atoms or a straight or branched chain alkylene (alkanediyl) group having 3 to 5 carbon atoms, and they may be the same or different; $R^3$ represents a straight or branched chain alkyl group having 1 to 5 carbon atoms; m represents 2 or 3; $R^4$ represents a straight or branched chain alkyl group having 1 to 5 carbon atoms or a $R^1-R^2-$ group; and p represents 0 or 1 provided $m+p=3$.

The thermal recording material of the present invention is further characterized by a protecting layer containing a macromolecular substance on the recording layer.

DETAILED DESCRIPTION OF THE INVENTION

Specific examples of supports which may be employed in the present invention include those which are generally used for this type of recording materials, such as plastics, e.g., polyethylene terephthalate films and polycarbonate films, glass plates, sheets of paper, plateform or foil-form metals and so on. Of these materials, a polyethylene terephthalate film is particularly favorable as the support for the recording material of the present invention.

The recording layer which can be employed in the present invention is a layer possessing high optical density, and is preferably formed of a substance that exhibits high covering power in a thin layer. Typical examples of such substances are, for instance, metals. In addition, the recording layer may be constructed of another layer consisting of a different substance laminated on a metal layer to increase recording sensitivity as described hereinafter, or it may be a layer in which other substances are mixed with metals by means of, for example, co-deposition to increase the recording sensitivity. The recording layer is the principal layer contributing to the change in optical permeability or reflectance of the recording material which results from thermal deformation, occurring in the areas irradiated with a laser beam or the like. A wide variety of layer constructions and substances can be chosen for the recording layer.

Specific examples of metals which can be employed for the recording layer include Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se and Te, and these metals may be used individually or in combinations of two or more. Preferably the metals employed in the present invention have low toxicity, require small energy for fusion or evaporation, form films with ease, etc. The most favorable metals are Sn, Bi and In. These metals are provided on the subbing layer described in detail below by a single layer or plural layers by subjecting these metals to vacuum evaporation, sputtering, ion plating, electroplating, electroless plating or other treatments in a simple metal, a mixture of two or more metals or alloys thereof.

The metal layer should have a thickness sufficient to provide the optical density required for forming images. For instance, a thickness ranging from 300 Å to 1,500 Å is generally required in order to attain a transmission density of 2. Of course the thickness depends upon the metal(s) used. In addition, the thickness necessary to attain the desirable optical density varies with the layer structure of the metal layer formed which depends upon the support used, the temperature of the support during deposition, the pressure inside the vacuum line used for deposition, deposition speed and so on even when the same metal is used for forming the metal layer on, for example, a support according to a vacuum deposition technique, a sputtering technique, an ion plating technique or so on.

Further, materials suitable for increasing the recording sensitivity should be added to the recording layer in addition to the above-described metals such that they are laminated on the metal layer or mixed with the metal(s). These material can increase the recording sensitivity by, for example, preventing reflection, increase thermal deformation, etc.

Materials used for this puprose, which can accelerate thermal deformation, include as specific examples metal oxides such as PbO, $WO_3$, $TiO_2$, SiO, $SiO_2$, $ZrO_2$ and the like; chalcogen compounds of Ge, In, Sn, Cu, Ag, Fe, Bi, Al, Si, Zn, V and the like; metal halides such as $PbX_2$, AgX, $SnX_2$, $SbX_5$, $SbX_3$ and the like (wherein X represents a fluorine atom, a chlorine atom, a bromine atom or an iodine atom); and As, Sb, P, Ge, Si, Te and the like. Desirable characteristics for these substances are low toxicity; low hygroscopicity or deliquescence, or free of dark reaction with the metals; to produce films with ease; etc.

From the above-described point of view, GeS, SnS, $PbI_2$ and the like are particularly preferable.

The thickness of a layer made of one of these materials depends upon the metal(s) or compounds used, the thickness of the metal layer and so on. However, a preferable thickness of such a layer usually ranges from about 50 to 1,000 Å. In the case that one or more of a metal layer and one or more layers of such compounds as described above are employed for constructing a recording layer, they may be alternately laminated. Therein, since the layers of sensitivity increasing materials generally possess a reflection preventing effect, it is desirable for layers of these compounds to be arranged on the side of the material nearer the source of the laser beam than the corresponding metal layer. In addition, in the above-described case the sum of the thickness for the individual metal layers and the sum of thicknesses for the individual layers of sensitivity increasing compounds are adjusted so as to fall in the respective thicknesses, which are described hereinbefore, respectively. On the other hand, in case that a layer of a metal-compound mixture is provided using a co-deposition technique, a preferable mixing ratio of the metal to the compound ranges from about 1:0.1 to 1:1, when calculated in terms of corresponding thickness. The above-described metal layers, compound layers and/or mixed layers are properly combined and the resulting combinations can be employed as a recording layer.

A protecting layer provided on the recording layer may be made of either inorganic or organic substances. Of inorganic substances, transparent ones such as $Al_2O_3$, $SiO_2$, SiO, MgO, ZnO, $MgF_2$, $CuF_2$ and the like are desirable. The protecting layer is formed by subjecting these substances to vacuum deposition, a sputtering, a reactive deposition such as ion plating or the like, etc.

On the other hand, excellent results are obtained by using organic substances for making the protecting layer. High molecular materials possessing a film forming ability can be used. Specific examples of high molecular material suitable for this purpose include various polymers such as styrene polymers, e.g., polystyrene, styrene-maleic anhydride copolymers, etc.; vinyl acetate polymers, e.g., polyvinyl acetate, polyvinyl alcohol, polyvinyl butyral, polyvinyl formal, etc.; methacrylic acid ester resins, e.g., polyisobutylmethacrylate, polymethylmethacrylate, etc.; amide polymers, e.g., polydiacetone acrylamide, polyacrylamide, etc.; cellulose or derivatives thereof, e.g., ethyl cellulose, cellulose acetate butyrate, cellulose nitrate, diacetyl cellulose, etc.; halogenated polyolefins, e.g., polyvinyl chloride, chlorinated polyethylene, chlorinated polypropylene, etc.; phenol resins; soluble polyesters; soluble nylons; gelatins; and copolymers thereof. These high molecular materials each is dissolved in a proper solvent and applied to the recording layer using a known coating technique.

The solvent employed to coat the protecting layer can be selected from various solvents depending upon the high molecular material used. Specific examples of such solvents include acetone, methyl ethyl ketone, methyl isobutyl ketone, diacetone alcohol, methyl cellosolve, ethyl cellosolve, butyl cellosolve, methyl cellosolve acetate, ethyl cellosolve acetate, butyl cellosolve acetate, hexane, cyclohexane, ethylene chloride, methylene chloride, benzene, chlorobenzene, methanol, ethanol, propanol, isopropyl alcohol, butanol, petroleum ether, dimethyl formamide, thinner and so on.

To these high molecular materials it is possible to add various additives such as pigments, matting agents, plasticizers, lubricants and so on depending on the purpose or the end use of the recording material. Exemplary pigments are azo type pigments, triphenylmethane type pigments, quinoline type pigments, anthraquinone type pigments, phthalocyanine type pigments or inorganic pigments (e.g., carbon black, titanium white, chrome yellow, etc.), etc. Exemplary matting agents include colloidal silica, etc. Exemplary plasticizers include diesters of phthalic acid (e.g., dibutyl phthalate, di-n-octyl phthalate, dioctyl phthalate, dinonyl phthalate, dilauryl phthalate, butyl benzyl phthalate, etc.), esters of aliphatic dibasic acids (e.g., di(2-ethylhexyl) adipate, di(2-ethylhexyl) sebacate, etc.), triesters of phosphoric acid (e.g., tricresyl phosphate, tri(2-ethylhexyl) phosphate, etc.), glycol esters (e.g., polyethylene glycol ester, etc.), epoxy compounds, etc. Finally, examples of lubricants are higher fatty acids or acid amides thereof, wax, etc.

In particular, it is effective from the standpoint of improving film strength of the surface of the recording material to add higher fatty acids having 11 or more carbon atoms or acid amides thereof in a porportion of about 0.1 to 10% by weight to the high molecular material (e.g., behenic acid, stearic acid, palmitic acid, etc.) Alternatively, the higher fatty acids or acid amides may be coated on the protecting layer in a thickness of about 0.001 to $1\mu$ in a conventional manner.

For the thickness of the protecting layer of the present invention, the optimum value must be chosen by taking account the mechanical strength as a film, keeping stability, recording sensitivity and other properties each of which is indispensable for the recording material. A preferable thickness of the protecting layer ranges, in general, from about 0.01μ to 15μ.

A double layer construction is desirable for the protecting layer to enable the protecting layer to possess sufficient mechanical strength with only a slight drop in the sensitivity of the recording layer, as disclosed in Japanese Patent Applications Nos. 77267/'78 and 79072/'78 (corresponding to U.S. patent application Ser. No. 52,511 filed June 26, 1979 and filed June 26, 1979, respectively.) Therein, the lower layer, which is in contact with the recording layer, is made up of a soft high molecular material having a low softening point, while the upper layer is made up by a high molecular material possessing high mechanical strength, which can be selected without concern for the softening point.

On the occasion that the protecting layer is formed by laminating a plurality of layers using a coating technique and further, a lubricant is applied thereto to increase surface strength, a solvent of a coating solution used for making an upper layer must not dissolve the substance constituting the layer which was previously provided therebeneath using a coating technique or a deposition technique to decompose to or to convert into different substances, because the solvent of the upper layer can permeate into the lower layer. Therefore, solvents employed for the coating solution of an upper layer are limited and consequently, the substances employed for coating are also restricted to specific ones.

Specific examples of chlorinated polyolefins which can be employed in the subbing layer in the present invention include chlorinated polyethylene, chlorinated polypropylene and the mixture thereof, which each has a degree of chlorination (chlorine content) of about 30% by weight or more and preferably, ranging from about 50% by weight to about 73% by weight, in the aspects of stability and solubility. These polyolefins preferably have a viscosity of about 20 to 5000 cps (40% toluene solution (25° C.)). The layer formed by chlorinated polyolefin having a chlorination degree of less than about 30% by weight possesses rubber-like properties and therefore, it is difficult to provide thereon a uniform recording layer using a deposition technique.

Aminoalkyl alkoxysilane compounds employed in the present invention are represented by the formula (I):

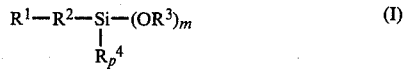

wherein $R^1$ represents an amino group or a $H_2N-R^5-NH-$ group. The amino group may be substituted with one or two substituents of methyl, ethyl, hydroxymethyl or hydroxyethyl. $R^2$ and $R^5$ each represents a polymethylene group having 1 to 2 carbon atoms or a straight or branched chain alkylene (alkanediyl) group having 3 to 5 carbon atoms and may be the same or different. Specific examples of the polymethylene groups include methylene, ethylene. Specific examples of the alkanediyl or the alkylene groups include trimethylene, tetramethylene, pentamethylene, 1,2-propanediyl, propylidene, 1-methyl-1,3-propanediyl (—CH$_2$—CH$_2$—CH(CH$_3$)—), 2-methyl-1,3-propanediyl, ethylmethylene, butylidene, 1-methyl-1,4-butanediyl, 2-methyl-1,4-butanediyl, 1-ethyl-1,3-propanediyl, 2-ethyl-1,3-propanediyl, propylethylene and pantylidene. Of these groups, methylene, ethylene, trimethylene, tetramethylene, 1,2-propanediyl and 2-methyl-1,3-propanediyl are preferred. In the present invention, the term "alkylene group" or "alkanediyl group" includes "alkylidene group".

$R^3$ represents a straight or branched chain alkyl group having 1 to 5 carbon atoms, with specific examples including methyl, ethyl, propyl, butyl, pentyl, isopropyl, isobutyl, sec-butyl and isoamyl groups. Of these groups, preferred are methyl, ethyl and propyl. $R^4$ represents a straight or branched chain alkyl group having 1 to 5 carbon atoms, or an $R^1-R^2-$ group. When $R^4$ represents an alkyl group, the specific examples and the preferred examples thereof are the same as defined for $R^3$. m and p represent 3 or 2 and 0 or 1, respectively, provided m+p=3, preferably m=3.

Specific examples of the aminoalkyl alkoxysilane compounds represented by the formula (I) include:

Compound 1—[3-[(2-Aminoethyl)amino]propyl]trimethoxysilane (b.p. 259° C., Chemical Abstracts Service Registry Number (abbreviated as CASR#1760-24-3),
Compound 2—(3-Aminopropyl)triethoxysilane (b.p. 217° C., CASR#919-30-2),
Compound 3—[3-[(2-Aminoethyl)amino]propyl]dimethoxymethylsilane (CASR#3069-29-2),
Compound 4—(Aminomethyl)triethoxysilane (CASR#18306-83-7),
Compound 5—(3-Aminopropyl)trimethoxysilane (CASR190 59379-66-7),
Compound 6—(2-Aminoethyl)triethoxysilane (CASR#45074-31-5),
Compound 7—[3-[(2-Aminoethyl)amino]-2-methylpropyl]dimethoxymethylsilane (CASR#23410-40-4),
Compound 8—(4-Aminobutyl)diethoxymethylsilane (CASR#3037-72-7),
Compound 9—(4-Aminobutyl)triethoxysilane (CASR#3069-30-5),
Compound 10—[4-[(2-Aminoethyl)amino]butyl]triethoxysilane (described in U.S. Pat. No. 3,252,825),
Compound 11—[3-[(2-Aminoethyl)amino]-2-methylpropyl]triethoxysilane (CASR#56541-78-7),
Compound 12—2-(Diethoxymethylsilyl)ethaneamine (CASR#51250-43-2),
Compound 13—3-(diethoxyethylsilyl)-1-propaneamine (CASR#20723-29-9),
Compound 14—2-(Diethoxymethylsilyl)-1-propaneamine (CASR#53813-15-3),
Compound 15—3-(Diethoxymethylsilyl)-1-propaneamine (CASR#3179-76-8),
Compound 16—3-(Diethoxymethylsilyl)-1-propaneamine (CASR#3663-44-3),
Compound 17—2-Triethoxysilyl-1-propaneamine (CASR#36957-84-3),
Compound 18—3-(Trimethoxysilyl)-1-propaneamine (CASR#13822-56-5),
Compound 19—2-(Trimethoxysilyl)-1-propaneamine (CASR#50602-95-4),
Compound 20—1-(Triethoxysilyl)-2-propaneamine (CASR#53218-21-6),
Compound 21—2-(Tributoxysilyl)-1-propaneamine (CASR#53813-14-2),
Compound 22—3-(Tributoxysilyl)-1-propaneamine (CASR#52340-01-9),
Compound 23—[2-[(2-Aminoethyl)amino]ethyl]trimethoxysilane (CASR#7719-00-8),
Compound 24—[[(2-Aminoethyl)amino]methyl]trimethoxysilane (CASR#51980-40-6),
Compound 25—N-[1-(trimethoxysilyl)propyl]-1,2-ethanediamine (CASR#13170-53-1),
Compound 26—N-[2-(trimethoxysilyl)propyl]-1,2-ethanediamine (CASR#42346-52-1), Compound 27—[[(2-Aminoethyl)amino]methyl]-tributoxysilane (CASR#42040-66-4),
Compound 28—[3-[(2-Aminoethyl)amino]propyl]-tributoxysilane (CASR#51895-55-7), and
Compound 29—[3-[(2-Aminoethyl)amino]-2-methylpropyl]trimethoxysilane (described in Belgian Pat. No. 642,698 and British Pat. No. 1,005,475).

The subbing layer containing the chlorinated polyolefin and the aminoalkyl alkoxysilane compound can be provided on the support using a conventional coating technique. As solvents for preparing a coating solution which may be employed in the coating process, known solvents such as toluene, xylene, ethyl acetate, butyl acetate, cellosolve acetate, methyl ethyl ketone, 1,2-dichloroethane, methyl isobutyl ketone, cyclohexanone, tetrahydrofuran, ethyl ether, dioxane and the like can be used. Besides these solvents, mixed solvents wherein two or more solvents as described above are mixed, or wherein parts of the above-described solvents each is replaced by a nonsolvent such as cyclohexane, isopropyl alcohol or so on, can be also employed.

Certain additives, for example, an ultraviolet ray absorbing agent and the like, may be added to the chlorinated polyolefin to increase the stability thereof.

When a subbing layer of the chlorinated polyolefin and the aminoalkyl alkoxysilane compound is provided beneath the recording layer in a thickness of $0.05\mu$ or more, the subbing layer exhibits a sufficient effect to increase the recording sensitivity, and the extent of its effect is not in proportion to its thickness. In general, a thickness of about $0.05\mu$ to $5\mu$ is adequate for the subbing layer, and a thickness of about $0.1\mu$ to $1\mu$ is particularly preferred.

On the other hand, the aminoalkyl alkoxysilane compound can exhibit an increase in adhesion between the support and the recording layer when it is contained in the subbing layer in a porportion of about 1 part or more per 100 parts by weight of the chlorinated polyolefin. Moreover, it has a particularly suitable effect when contained in a proportion of 5 parts by weight or more. However, since excessive addition of the aminoalkyl alkoxysilane compound leads to a reduction in the stability of the coating solution for making the subbing layer, the addition of the aminoalkyl alkoxysilane compound is desirably limited to 100 parts by weight or less per 100 parts by weight of the chlorinated polyolefin.

In accordance with embodiments of the present invention, thermal recording materials possessing high sensitivity and excellent adhesion between the recording layer and the support can be obtained. A variety of resins can be used for the protecting layer using a coating technique and the subbing layers provided in thermal recording materials according to the embodiments of the present invention permit a broad selection of solvents, for the coating solutions of such resins, and further, can contribute to the improvement upon the recording sensitivity. Moreover, highly sensitive thermal recording materials having subbing layers excellent in solvent resistance can be obtained according to the present invention. In addition, adhesion between the recording layer and the support can be increased according to the embodiments of the present invention without adversely affecting the sensitivity of the thermal recording material which is rendered highly sensitive by the chlorinated polyolefin in the subbing layer.

The present invention will now be illustrated in greater detail by reference to the following examples.

EXAMPLE 1

Four samples for comparison (corresponding to Examples Nos. 1-1 to 1-4 in Table 1) were prepared as follows:

Each of the metals set forth in Table 1 was deposited in a thin metal layer having a thickness of 350 Å on a polyethylene terephthalate film having a thickness of 100 $\mu$m under a reduced pressure of $5 \times 10^{-5}$ Torr and further, either the chalcogen compound or halogenide set forth in Table 1 was deposited to provide the compound layer in a thickness of 200 Å onto each of the resulting thin metal layers under the same pressure. The thus obtained samples each had optical density (transmission) ranging from 1 to 2.

Samples in accordance with the present invention were prepared as follows:

A subbing layer was first formed by coating, on a polyethylene terephthalate film having a thickness of 100 $\mu$m, a coating solution having the following composition at a dry coverage of 0.3 $\mu$m:

| Composition of Coating Solution | |
|---|---|
| Chlorinated Polyethylene (Chlorine content: about 69 wt %, Viscosity measured at 25° C. in form of 35 wt % toluene solution: 300 to 400 cps, Trade name: Super Chlone 907 HA, products of Sanyo Kokusaku Pulp Co., Ltd.) | 2 g |
| [3-[(2-Aminoethyl)amino]propyl]trimethoxysilane (Trade name: Silane Coupling Agent SH-6020, products of Toray Silicone Co., Ltd.) | 0.5 g |
| Methyl Ethyl Ketone | 70 ml |
| Methyl Cellosolve Acetate | 30 ml |

Next, on the resulting subbing layer a metal layer and a compound layer were formed in this order under the same condition as in the samples for comparison. The thus obtained samples correspond to Sample Nos. 1-5 to 1-8 in Table 1. An effect of the present invention can be clarified by comparing each pair of samples, wherein one sample differs from the other only in the presence of the subbing layer, such as the pair of Sample 1-1 and Sample 1-5 and so on. Recording was carried out by scanning each sample for comparison or each sample of the present invention at the side of the respective recording layer with an argon ion laser beam (having wave length of 5145 Å), which beam had the maximum power of 2 W and was focused by a lens so as to have a diameter of 25 $\mu$m. Therein, the scanning speed taken was 19 m/sec, and the minimal value of the output power of the laser beam required for the formation of a recorded mark having a diameter of 10 $\mu$m on each of samples was determined. The recording sensitivities of samples were compared with one another through the evaluation of the respective extent of the minimal output power described above. Namely, the smaller the extent of this power, the higher the recording sensitivity.

On the other hand, adhesion was evaluated as follows: Cuts were made in the recording layer using a steel knife in depth capable of reaching the support, at intervals of one millimeter, in parallel lines and in both longitudinal and transverse directions. Thus, the recording layer was divided into one hundred squares which each had the same square measure of 1 mm × 1 mm. Then, a mylar tape (polyethylene terephthalate pressure sensitive adhesive tape No-31 B, products of Nitto Electric Industrial Co., Ltd.) was stuck to the resulting recording layer. Thereafter, the tape was peeled off with a strong force in the direction of upward 90°, and the extent of adhesion was evaluated by counting the number of squares remaining on the support. Namely, the greater the number of the area remaining, the better the adhesiveness. The results of the recording sensitivity and the adhesion in each sample are summarized in Table 1. As can be seen clearly from Table 1, the above-described output power of the laser beam required for recording is smaller in each of samples of the present invention than in the respective sample for comparison, that is to say, all the samples of the present invention are evidently improved upon the sensitivity. In addition, the adhesion between the support and the recording layer is also strengthened to a great extent in the present invention. In the table, the adhesion is represented by the number of squares remaining (numerator) per 100 squares (denominator).

Moreover, in case that an arbitrary protecting layer was provided on each pair of samples, similar differences between the sample of the present invention and the sample for comparison in the recording sensitivity and the adhesion were also observed.

tion of reduced pressure of $5 \times 10^{-5}$ Torr, resulting in the formation of a recording layer. Thus, a sample of the present invention was prepared. On the other hand, a sample for comparison was prepared by forming a different subbing layer made up by chlorinated polyethylene alone (the above-described Super Chlone 907 HA) in a layer having a thickness of 0.3 μm on a polyethylene terephthalate film having a thickness of 100 μm and then, by forming thereon the same recording layer as described above in this example under the same condition of reduced pressure of $5 \times 10^{-5}$ Torr. Next, the recording sensitivity of each sample was evaluated using the process illustrated in Example 1, wherein the value of minimal output power of a laser beam required for recording was 175 mW on every sample. In addition, the adhesiveness between the recording layer and the support was examined in the same manner as illustrated in Example 1. The value of 100/100 was obtained in the sample of the present invention, while 30/100 in the sample for comparison. Namely, it has proved from the above-described measurements that the subbing layer made up by chlorinated polyethylene into which [3-[(2-aminoethyl)amino]propyl]trimethoxysilane was incorporated (sample of the present invention) can in-

TABLE 1

| Sample No. | Subbing Layer | Recording Layer | | | Laser Power (mW) Required for Recording | Adhesion |
|---|---|---|---|---|---|---|
| | | Metal | Layer | Compound | Layer | | |
| 1-1 | Absence | Sn | 350Å | SnS | 200Å | 200 | 45/100 |
| 1-2 | " | Sn | " | GeS | " | 175 | " |
| 1-3 | " | Sn | " | PbI$_2$ | " | 100 | " |
| 1-4 | " | In | " | GeS | " | 175 | " |
| 1-5 | Presence | Sn | " | SnS | " | 150 | 100/100 |
| 1-6 | " | Sn | " | GeS | " | 125 | " |
| 1-7 | " | Sn | " | PbI$_2$ | " | 75 | " |
| 1-8 | " | In | " | GeS | " | 125 | " |

EXAMPLE 2

By the use of chlorinated polypropylene (trade name: Super Chlone 406, products of Sanyo Kokusaku Pulp Co., Ltd.; chlorine content; about 68 wt%; viscosity measured at 25° C. in a form of a 40 wt% toluene solution: 50±10 cps) instead of chlorinated polyethylene employed in Example 1, were thermal recording materials prepared in the same manner as in Example 1. The samples of this example proved to exhibit quite similar effects upon increasing the sensitivity and upon the improvement in adhesion.

EXAMPLE 3

On a polyethylene terephthalate film having a thickness of 100 μm, was coated a solution in which 25 parts by weight of [3-[(2-aminoethyl)amino]propyl]trimethoxysilane was contained per 100 parts by weight of chlorinated polyethylene (trade name: Super Chlone 907 HA) at a dry coverage of 0.3 μm to form a subbing layer. Onto the resulting subbing layer, Sn was deposited to provide a thin layer having a thickness of 300 Å and subsequently, GeS was deposited thereon to form a thin layer having a thickness of 250 Å under the condicrease the adhesion to a great extent without causing the lowering in the sensitivity of a recording layer, compared with the subbing layer made up by only chlorinated polyethylene.

EXAMPLE 4

Many different subbing layers were provided on separate polyethylene terephthalate films 100 μm in thickness by coating various kinds of coating solutions at dry coverage of 0.3 μm, which solutions comprise chlorinated polyethylene (Super Chlone 907 HA) in which various kinds of aminoalkyl alkoxysilane compounds or various kinds of alkoxysilane compounds were further added in amounts of 25 parts by weight per 100 parts by weight of the chlorinated polyethylene. On each of these subbing layers, the same recording layer as described in Example 3 was, then, provided. The recording sensitivity was 100 mW in every sample. However, only samples of the present invention, which contained aminoalkyl alkoxysilane compounds, were specifically effective upon the improvement in the adhesiveness. The extent of effect brought upon adhesiveness by the use of various kinds of alkoxysilane compounds are summarized in Table 2.

TABLE 2

| Sample No. | Compound | Structural Formula | Adhesion |
|---|---|---|---|
| 2-1 | [3-[(2-Aminoethyl)amino]-propyl]tri-methoxysillane | $NH_2-CH_2-CH_2-NH-(CH_2)_3-Si-(OCH_3)_3$ | Δ |
| 2-2 | (3-Aminopropyl)tri- | $NH_2-(CH_2)_3-Si-(OC_2H_5)_3$ | Δ |

TABLE 2-continued

| Sample No. | Compound | Structural Formula | Adhesion |
|---|---|---|---|
| | ethoxysilane | | |
| 2-3 | (Aminoethyl)triethoxysilane | $NH_2-CH_2-Si-(OC_2H_5)_3$ | Δ |
| 2-4 | Vinyltriethoxysilane | $CH_2=CH-Si(OC_2H_5)_3$ | X |
| 2-5 | Vinyltrimethoxysilane | $CH_2=CH-Si-(OCH_3)$ | X |
| 2-6 | Vinyltris(β-methoxyethoxy)silane | $CH_2=CH-Si-(OCH_2CH_2OCH_3)_3$ | X |
| 2-7 | γ-Glycidyloxypropyltrimethoxysilane | $CH_2-CH-CH_2-O-(CH_2)_3$ $\backslash\,/$ $O$ $-Si-(OCH_3)_3$ | X |
| 2-8 | Vinyltriacetoxysilane | $CH_2=CH-Si-(OOCCH_3)_3$ | X |
| 2-9 | γ-Mercaptopropyltrimethoxysilane | $HSCH_2CH_2CH_2-Si-(OCH_3)_3$ | X |
| 2-10 | β-(3,4-Epoxycyclohexyl)-ethyltrimethoxysilane | *** | X |
| 2-11 | γ-Methacryloyloxypropyltrimethoxysilane | $\begin{array}{c}CH_3\;\;\;\;O\\ \mid\;\;\;\;\;\;\;\parallel\\CH_2=C-C-O-(CH_2)_3-Si\\-(OCH_3)_3\end{array}$ | X |

*** 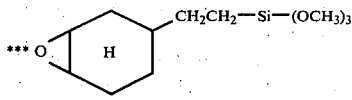

As can be seen apparently from the results of Table 2, only samples containing aminoalkyl alkoxysilane compounds of the present invention, which correspond to sample Nos. 2-1 to 2-3, can exhibit specifically excellent effect upon the improvement in the adhesion between the recording layer and the support.

In the column "Adhesion" in Table 2, a Δ mark represents good adhesiveness, and a X mark represents poor adhesiveness. The extent of adhesiveness was examined in the same manner as described in Example 1.

EXAMPLE 5

A subbing layer was provided on a polyethylene terephthalate film 100 μm in thickness by coating a solution prepared by the following formula I at a dry coverage of 0.3 μm:

| Formula I | |
|---|---|
| Chlorinated Polyethylene (Super Chlone 907 HA) | 2 g |
| (3-Aminopropyl)triethoxysilane (Silane Coupling Agent A-1100, products of Nippon Unicar Co., Ltd.) | 0.5 g |
| Methyl Ethyl Ketone | 70 ml |
| Methyl Cellosolve Acetate | 30 ml |

Next, a recording layer wherein In and GeS were contained in a physically mixed state, was provided on the above-described subbing layer by subjecting In and GeS to a co-evaporation treatment under condition of reduced pressure of $5\times10^{-5}$ Torr in amounts corresponding to thickness of 300 Å and 250 Å which could be reached by separate evaporation treatments, respectively. Then, on the above-described recording layer, the first protecting layer of ethylene-vinyl acetate copolymer was formed by coating a solution prepared by the following formula II at a dry coverage of 4 μm:

| Formula II | |
|---|---|
| Ethylene-vinyl acetate Copolymer (Content by weight: ethylene 81%, vinyl acetate 19%, Trade name: Evaflex #410, product of Mitsui Poly Chemical Co., Ltd.) | 6 g |
| Cyclohexane | 70 ml |
| Toluene | 30 ml |

Next, several coating solutions containing 10 g of vinyl chloride-vinyl acetate copolymer, which differed in solvent used, were prepared with the intention of forming the second protecting layer having a dry thickness of 6 μm on the above-described first protecting layer. Therein, "MPRT-5", trade name by Nisshin Chemical Industry Co., Ltd., having a vinyl chloride content of 75% by weight and a vinyl acetate content of 25% by weight, was employed as vinyl chloride-vinyl acetate copolymer, and solvents used had the following formulae $III_1$ to $III_5$, respectively:

| Solvent Formula $III_1$ | |
|---|---|
| Methyl Ethyl Ketone | 50 ml |
| Methyl Cellosolve Acetate | 50 ml |
| Solvent Formula $III_2$ | |
| Acetone | 70 ml |
| Methyl Ethyl Ketone | 20 ml |
| Methyl Cellosolve Acetate | 10 ml |
| Solvent Formula $III_3$ | |
| Acetone | 90 ml |
| Cyclohexane | 5 ml |
| Methyl Cellosolve Acetate | 5 ml |
| Solvent Formula $III_4$ | |
| Acetone | 20 ml |
| Methyl Cellosolve | 70 ml |
| Diacetone Alcohol | 10 ml |
| Solvent Formula $III_5$ | |
| Acetone | 90 ml |
| Methyl Alcohol | 5 ml |

| Methyl Cellosolve Acetate | 5 ml |
| --- | --- |

Thus, five samples in accordance with the present invention were obtained.

On the other hand, for the purpose of comparison were prepared samples having recording layers, the first protecting layers and the second protecting layers provided in this order under the same conditions as described above and that, having subbing layers differing in their constitution from the samples of the present invention, namely in each sample for comparison the subbing layer was provided on a polyethylene terephthalate film 100 μm in thickness at a dry coverage of 0.3 μm using a coating composition corresponding to the (3-aminopropyl)triethoxysilane-free Formula I and therefore, it contained chlorinated polyethylene alone.

From thorough observations of the thus obtained samples, it is clear that all of the samples of the present invention had uniform and even surfaces on both sides thereof, while in samples for comparison there occurred cracking of the recording layer, or blurs appeared at the back side of the support. These undesirable phenomena are seemed to occur because coating solvents used for providing the second protecting layer reach the subbing layer and therethrough, partial dissolution of chlorinated polyethylene thereinto takes place. Thus, the improvement in solvent resistance resulting from the addition of (3-aminopropyl)triethoxysilane to chlorinated polyethylene was confirmed in this Example 5.

While the invention has been described in detail and with reference to specific embodiments thereof, it will be apparent to one skilled in the art that various changes and modifications can be made therein without departing from the spirit and scope thereof.

What is claimed is:

1. A thermal recording material having increased recording sensitivity to thermal radiation which comprises a support having thereon in sequence a subbing layer and a recording layer comprising metal having high optical density which undergoes thermal deformation under the action of high intensity radiation to result in a difference in optical density between irradiated areas and non-irradiated areas, said subbing layer containing a composition which comprises (A) 100 parts by weight of chlorinated polyolefin selected from the group consisting of chlorinated polyethylene, chlorinated polypropylene or a mixture thereof having a chlorine content of about 30% by weight or more, said chlorinated polyolefin increasing the thermal recording sensitivity of said recording layer and (B) a one part by weight to 100 parts by weight of aminoalkyl alkoxysilane compound represented by the following general formula (I):

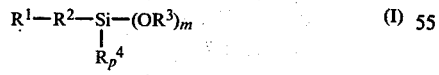

wherein $R^1$ represents an amino group or a $H_2N-R^5-NH-$ group; $R^2$ and $R^5$ each represents a polymethylene group having 1 to 2 carbon atoms or a straight or branched chain alkanediyl or alkylene group having 3 to 5 carbon atoms, and may be the same or different; $R^3$ represents a straight or branched chain alkyl group having 1 to 5 carbon atoms; m represents 2 to 3; $R^4$ represents a straight or branched chain alkyl group having 1 to 5 carbon atoms or a $R^1-R^2-$ group; and p represents 0 or 1, provided m+p=3.

2. The thermal recording material of claim 1, wherein a protecting layer is provided on said recording layer.

3. The thermal recording material of claim 2, wherein said protecting layer is a layer of $Al_2O_3$, $SiO_2$, $SiO$, $MgO$, $ZnO$, $MgF_2$ or $CuF_2$.

4. The thermal recording material of claim 2, wherein said protecting layer is a layer of a high molecular material selected from the group consisting of styrene polymers, vinyl acetate polymers, methacrylic acid ester resins, polyamides, polyacrylamides, cellulose or derivatives thereof, halogenated polyolefins, phenol resins, soluble polyesters, soluble nylons, gelatins, and copolymers thereof.

5. The thermal recording material of claim 2, wherein said protecting layer has a double layer construction.

6. The thermal recording of claim 1, wherein said metal is selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Pb, Po, Sn, As, Sb, Bi, Se, Te or combinations thereof.

7. The thermal recording material of claim 1, wherein said recording layer has a thickness sufficient to provide a transmission optical density of at least 2.0.

8. The thermal recording material of claim 7, wherein said layer is about 300 to 1500 Å thick.

9. The thermal recording material of claim 1, wherein said recording layer additionally contains in said layer or in a separate layer thereon, a material which improves the recording sensitivity.

10. The thermal recording material of claim 9, wherein said material which improves recording sensitivity, improves sensitivity by accelerating thermal deformation or preventing reflection.

11. The thermal recording material of claim 9, wherein said material is a metal oxide, a chalcogen compound, a metal halide or As, Sb, P, Ge, Si or Te.

12. The thermal recording material of claim 1, wherein said degree of chlorination ranges from about 50% to about 73% by weight.

13. The thermal recording material of claim 1, wherein said aminoalkyl alkoxysilane compound is selected from the group consisting of [3-[(2-aminoethyl)amino]propyl]trimethoxysilane, (3-aminopropyl)triethyoxysilane, [3-[(2-aminoethyl)amino]propyl]dimethoxymethylsilane, (aminomethyl)triethoxysilane, (3-aminopropyl)trimethoxysilane, (2-aminoethyl)triethoxysilane, [3-[(2-aminoethyl)amino]-2-methylpropyl]dimethoxymethylsilane, (4-aminobutyl)diethoxymethlsilane, (4-aminobutyl)triethoxysilane, [4-[(2-aminoethyl)amino]butyl]triethoxysilane, [3-[(2-aminoethyl)amino]-2-methylpropyl]triethoxysilane, 2-(diethoxymethylsilyl)ethaneamine, 3-(diethoxyethylsilyl)-1-propaneamine, 2-(diethoxymethylsilyl)-1-propaneamine, 3-(diethoxymethylsilyl)-1-propaneamine, 3-(dimethoxymethylsilyl)-1-propaneamine, 2-triethoxysilyl-1-propaneamine, 3-(trimethoxysilyl)-1-propaneamine, 2-(trimethoxysilyl)-1-propaneamine, 1-(triethoxysilyl)-2-propaneamine, 2-(tributoxysilyl)-1-propaneamine, 3-(tributoxysilyl)-1-propaneamine, [2-[(2-aminoethyl)amino]ethyl]-trimethoxysilane, [[(2-aminoethyl)amino]methyl]trimethoxysilane, N-[1-(trimethoxysilyl)propyl]-1,2-ethanediamine, N-[2-(trimethoxysilyl)propyl]-1,2-ethanediamine, [[(2-aminoethyl)amino]methyl]-tributoxysilane, [3-[(2-aminoethyl)amino]propyl]tributoxysilane and [3-[(2-aminoethyl)amino]-2-methylpropyl]trimethoxysilane.

14. The thermal recording material of claim 1 wherein said support is polyethylene terephthalate and said recording layer is a layer of a metal selected from the group consisting of Sn, Bi and In.

15. The thermal recording material of claim 14 wherein said recording layer is Sn.

* * * * *